G. HOWARD.
Hay Loader.

No. 24,806.

Patented July 19, 1859.

Inventor
G. Howard

UNITED STATES PATENT OFFICE.

GROVE HOWARD, OF WESTFIELD TOWNSHIP, MORROW COUNTY, OHIO.

IMPROVEMENT IN MACHINES FOR RAKING AND LOADING HAY.

Specification forming part of Letters Patent No. 24,806, dated July 19, 1859.

*To all whom it may concern:*

Be it known that I, GROVE HOWARD, of the township of Westfield, in the county of Morrow and State of Ohio, have invented a new and Improved Mode of Raking and Pitching Hay and other Substances of a Like Nature; and I do hereby declare the following to be a full and exact description thereof, reference being had to the accompanying drawings, and to the figures of reference marked thereon.

The nature of my invention consists in constructing and arranging the several parts of the machine substantially in the manner hereinafter set forth.

Figure 1:
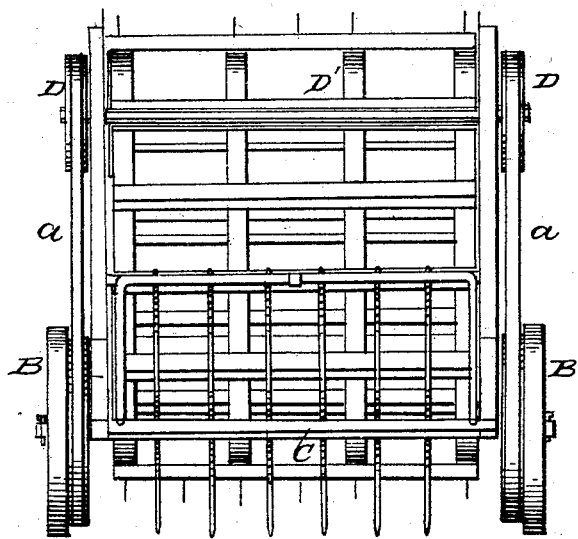
Figure 2:
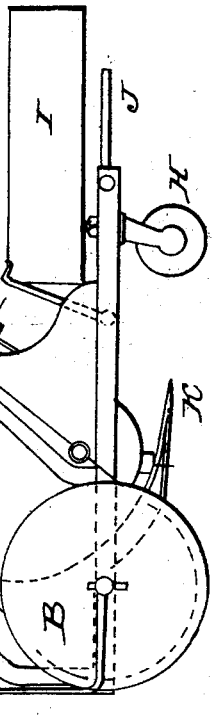
Figure 3:
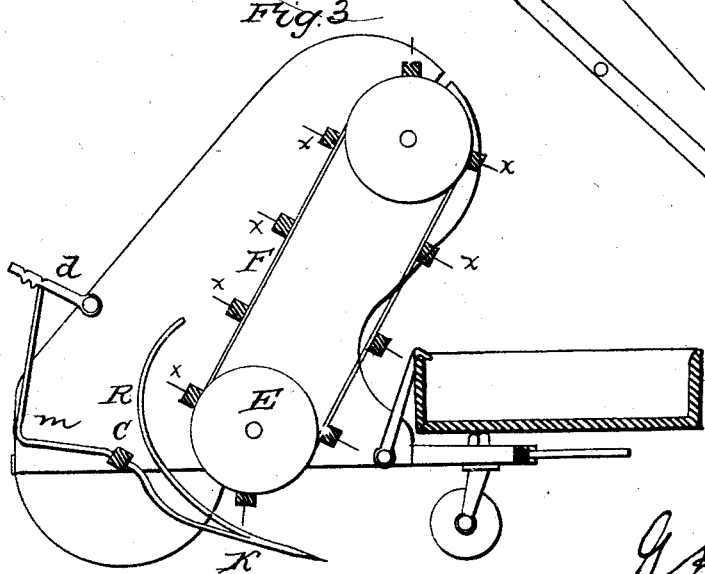

In the drawings, Figure 1 represents a plan view. Fig. 2 is a side elevation. Fig. 3 is a vertical longitudinal section.

In the several figures, A represents a frame, which is constructed of any suitable material, and which stands at an angle of about forty-five degrees. At the bottom and rear of this frame is secured an axle, C, at the extremities of which two wheels are attached and marked B B, the frame being supported upon said wheels. Near to the top of the frame an axle, D', passes through, and is provided with two pulleys, D D. An axle passes through the lower portion of the frame also, and is provided with pulleys E E. Around the axles on which the pulleys D and E are secured there passes an endless belt, F, said belt being provided on its outer surface with a series of teeth, $x\ x\ x\ x$. A band, $a$, passes around a pulley made on wheel B on each side, and thence around the pulley D. These bands $a\ a$ on each side serve to convey motion from the driving-wheels B to the pulleys D D. When the shaft on which pulleys D D revolves the endless belt also revolves, and so does the shaft on which pulleys E are secured.

K represents a series of rods attached to the main shaft C, and to which are secured a series of curved teeth, R. These curved teeth stand directly under the lower end of the belt F, as is shown in Fig. 3.

$m$ represents a lever secured to the shaft C, and $d$ represents a catch attached to the frame A for the purpose of holding said lever in proper position when desired.

J is the tongue of the machine.

H is a wheel, on which the front part of the frame is supported.

I represents a body or bed secured to the frame in front, near the tongue, in which the grain is received from the endless belt.

In operating this machine, power being applied, the points of the teeth R are lowered by means of lever $m$, and secured in such a manner that they will pass under and catch the hay up from the ground as the machine runs over it. The endless belt F being set in motion, as described, its teeth $x\ x$, passing around, receive the hay from the curved teeth R, and convey it up to the top of the frame, and when the belt changes direction to come down again, the hay falls from the teeth $x\ x$ and drops into the body I. This operation continues, and the hay is carried up and then deposited in the body I until it becomes full. The body is then emptied, and the machine continues its operation of filling the body again.

When it is desired to move the machine without having it catch the hay the lever $m$ may be made to raise the points of the teeth so that they will pass over the hay without touching it.

Having thus fully described my invention, what I claim as new, and desire to secure by Letters Patent, is—

The arrangement of the endless belt F, pulleys D and E, curved teeth R, rods K, lever $m$, and catch $d$ in the frame A, and with the body I, the whole being constructed and operating substantially as and for the purpose specified.

GROVE HOWARD.

Witnesses:
ELMORE SMITH,
HIRAM HOWARD.